US011167693B2

(12) United States Patent
Yamamoto et al.

(10) Patent No.: US 11,167,693 B2
(45) Date of Patent: Nov. 9, 2021

(54) VEHICLE ATTENTION SYSTEM AND METHOD

(71) Applicant: Honda Motor Co., Ltd., Tokyo (JP)

(72) Inventors: Stuart Masakazu Yamamoto, La Mirada, CA (US); Matias Monges, Los Angeles, CA (US); Joseph Anthony Alequin, Los Angeles, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 139 days.

(21) Appl. No.: 16/195,717

(22) Filed: Nov. 19, 2018

(65) Prior Publication Data
US 2020/0156539 A1 May 21, 2020

(51) Int. Cl.
B60Q 9/00 (2006.01)
G10L 15/26 (2006.01)
B60N 2/00 (2006.01)
B60N 2/90 (2018.01)
G06K 9/00 (2006.01)
G10L 15/22 (2006.01)
G06F 3/16 (2006.01)

(52) U.S. Cl.
CPC ............... B60Q 9/00 (2013.01); B60N 2/002 (2013.01); B60N 2/90 (2018.02); G06K 9/00228 (2013.01); G06K 9/00288 (2013.01); G10L 15/22 (2013.01); G10L 15/26 (2013.01); B60N 2002/981 (2018.02); G10L 2015/223 (2013.01)

(58) Field of Classification Search
CPC . B60Q 9/00; B60N 2/002; B60N 2/90; B60N 2002/981; G10L 15/265; G10L 15/22; G10L 2015/223; G10L 15/26; G06K 9/00228; G06K 9/00288; G06K 9/00832; G06F 3/167
See application file for complete search history.

(56) References Cited

U.S. PATENT DOCUMENTS

| 7,681,949 | B2* | 3/2010 | Nathan | B06B 3/00 297/217.3 |
| 8,344,894 | B2* | 1/2013 | Szczerba | G08B 21/06 340/576 |
| 8,710,965 | B2* | 4/2014 | Li | G06F 3/016 340/407.1 |

(Continued)

Primary Examiner — Nicholas K Wiltey
Assistant Examiner — Gabriel J Lambert
(74) Attorney, Agent, or Firm — Rankin, Hill & Clark LLP

(57) ABSTRACT

Vehicle attention systems and techniques may include using a first seat and first actuator, a second seat and second actuator, an image capture device, an image analyzer, a microphone, a voice analyzer, and a controller. The image capture device may capture an image of a seating arrangement of a vehicle. The image analyzer may be implemented via a processor and may identify a first occupant occupying the first seat of the vehicle and a second occupant occupying the second seat of the vehicle. The microphone may receive a sound sample. The voice analyzer may be implemented via the processor and may determine a target occupant and associated seat from among the first seat and the second seat based on the sound sample. The controller may activate the first actuator or the second actuator based on the determined target occupant and the determined associated seat.

19 Claims, 5 Drawing Sheets

(56) References Cited

U.S. PATENT DOCUMENTS

| | | | |
|---|---|---|---|
| 9,007,219 B2* | 4/2015 | Perle | G08B 6/00 |
| | | | 340/407.1 |
| 9,290,125 B2 | 3/2016 | Nagata et al. | |
| 9,725,036 B1* | 8/2017 | Tarte | B60Q 9/00 |
| 9,754,425 B1* | 9/2017 | Iqbal | G07C 5/008 |
| 10,647,237 B2* | 5/2020 | Song | B60W 10/30 |
| 2009/0055180 A1* | 2/2009 | Coon | B60R 16/0373 |
| | | | 704/251 |
| 2011/0195699 A1* | 8/2011 | Tadayon | H04M 3/53 |
| | | | 455/418 |
| 2012/0053793 A1* | 3/2012 | Sala | B60N 2/002 |
| | | | 701/45 |
| 2014/0195477 A1* | 7/2014 | Graumann | G06F 16/24578 |
| | | | 707/609 |
| 2014/0214424 A1* | 7/2014 | Wang | G10L 15/22 |
| | | | 704/246 |
| 2014/0274026 A1* | 9/2014 | Mahar | H04W 48/04 |
| | | | 455/419 |
| 2016/0371977 A1* | 12/2016 | Wingate | G01C 21/3492 |
| 2016/0379631 A1* | 12/2016 | Wang | G06F 3/167 |
| | | | 704/275 |
| 2017/0313248 A1* | 11/2017 | Kothari | B60R 1/00 |
| 2020/0043470 A1* | 2/2020 | Nishikawa | H04R 3/00 |
| 2020/0135190 A1* | 4/2020 | Kaja | G06F 21/32 |
| 2020/0171977 A1* | 6/2020 | Jales Costa | G06K 9/00838 |

* cited by examiner

VEHICLE ATTENTION SYSTEM AND METHOD

BACKGROUND

Distracted driving may include an act of driving while engaging in other activities that divert attention of the driving away from the road or from the primary task of driving. Distractions may be considered undesirable and may impact the driver's ability to operate a vehicle. For example, if the driver of the vehicle has to turn around to communicate with a passenger of the vehicle, this may be distracting to the driver of the vehicle.

BRIEF DESCRIPTION

According to one aspect, a vehicle attention system may include a first seat, a second seat, a user interface, and a controller. The first seat may include a first actuator. The second seat may include a second actuator. The user interface may receive a user input. The controller may activate the first actuator or the second actuator based on the user input.

According to another aspect, a seat attention system may include a first seat, a second seat, an image capture device, an image analyzer, a microphone, a voice analyzer, and a controller. The first seat may include a first actuator. The second seat may include a second actuator. The image capture device may capture an image of a seating arrangement within an area including the first seat and the second seat. The image analyzer may be implemented via a processor and may identify a first occupant occupying the first seat and a second occupant occupying the second seat. The microphone may receive a sound sample. The voice analyzer may be implemented via the processor and may determine a target occupant and associated seat from among the first seat and the second seat based on the sound sample. The controller may activate the first actuator or the second actuator based on the determined target occupant and the determined associated seat.

According to a further aspect, a vehicle attention method may include capturing an image of a seating arrangement of a vehicle including a first seat and a second seat, identifying a first occupant occupying the first seat of the vehicle and a second occupant occupying the second seat of the vehicle, receiving a sound sample, determining a target occupant and associated seat from among the first seat and the second seat based on the sound sample, and activating a first actuator of the first seat or a second actuator of the second seat based on the determined target occupant and the determined associated seat.

DETAILED DESCRIPTION

Figure 1:
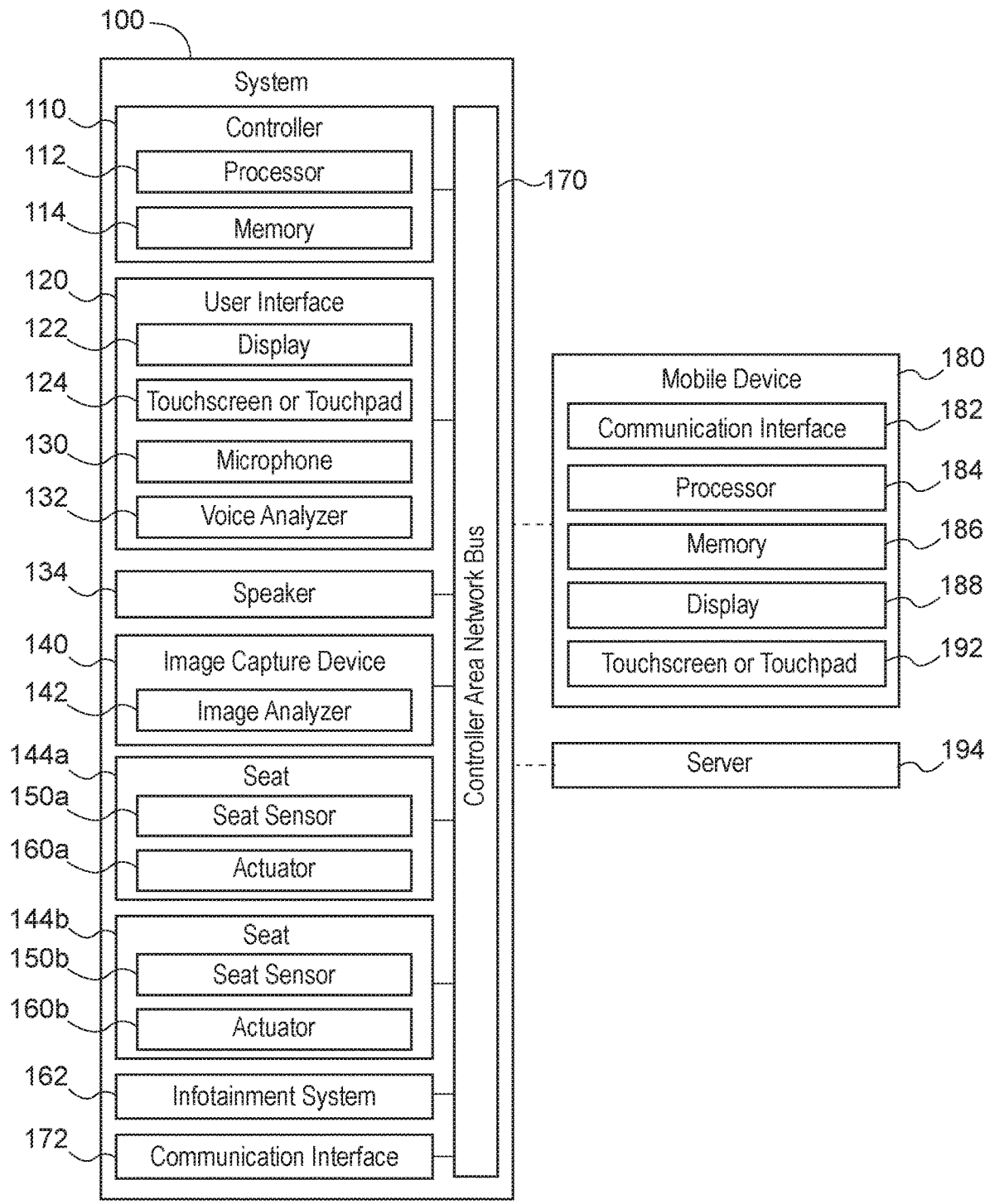
FIG. 1 is an exemplary component diagram of a vehicle attention system, according to one aspect.

The following includes definitions of selected terms employed herein. The definitions include various examples and/or forms of components that fall within the scope of a term and that may be used for implementation. The examples are not intended to be limiting. Further, one having ordinary skill in the art will appreciate that the components discussed herein, may be combined, omitted or organized with other components or organized into different architectures.

A "processor", as used herein, processes signals and performs general computing and arithmetic functions. Signals processed by the processor may include digital signals, data signals, computer instructions, processor instructions, messages, a bit, a bit stream, or other means that may be received, transmitted, and/or detected. Generally, the processor may be a variety of various processors including multiple single and multicore processors and co-processors and other multiple single and multicore processor and co-processor architectures. The processor may include various modules to execute various functions.

A "memory", as used herein, may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

A "disk" or "drive", as used herein, may be a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD-ROM). The disk may store an operating system that controls or allocates resources of a computing device.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

A "database", as used herein, may refer to a table, a set of tables, and a set of data stores (e.g., disks) and/or methods for accessing and/or manipulating those data stores.

An "operable connection", or a connection by which entities are "operably connected", is one in which signals, physical communications, and/or logical communications may be sent and/or received. An operable connection may include a wireless interface, a physical interface, a data interface, and/or an electrical interface.

A "computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "mobile device", as used herein, may be a computing device typically having a display screen with a user input (e.g., touch, keyboard) and a processor for computing. Mobile devices include handheld devices, mobile devices, smart phones, laptops, tablets, and e-readers.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

A "vehicle system", as used herein, may be any automatic or manual systems that may be used to enhance the vehicle, driving, and/or safety. Exemplary vehicle systems include an autonomous driving system, an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, a monitoring system, an occupant detection system, a vehicle suspension system, a vehicle seat configuration system, a vehicle cabin lighting system, an audio system, a sensory system, among others.

The aspects discussed herein may be described and implemented in the context of non-transitory computer-readable storage medium storing computer-executable instructions. Non-transitory computer-readable storage media include computer storage media and communication media. For example, flash memory drives, digital versatile discs (DVDs), compact discs (CDs), floppy disks, and tape cassettes. Non-transitory computer-readable storage media may include volatile and non-volatile, removable and non-removable media implemented in any method or technology for storage of information such as computer readable instructions, data structures, modules, or other data.

FIG. 1 is an exemplary component diagram of a vehicle attention system 100, according to one aspect. The vehicle attention system 100 may include a controller 110. The controller 110 may include a processor 112 and a memory 114. The vehicle attention system 100 may include a user interface 120. The user interface 120 may include a display 122, a touchscreen 124 or touchpad, and a microphone 130. The vehicle attention system 100 may include a voice analyzer 132, a speaker 134, an image capture device 140, and an image analyzer 142. Additionally, the vehicle attention system 100 may include one or more seats, such as a first seat 144a, a second seat 144b, a third seat, etc. Each one of the seats may include a seat sensor and an actuator. For example, the first seat 144a may include a first seat sensor 150a and a first actuator 160a, the second seat 144b may include a second seat sensor 150b and a second actuator 160b, etc. The vehicle attention system 100 may further include an infotainment system 162, a controller area network (CAN) bus 170, and a communication interface 172.

The vehicle attention system 100 may be communicatively coupled with a mobile device 180 via the communication interface 172. The mobile device 180 may include its own communication interface 182, a processor 184, a memory 186, a display 188, and a touchscreen 192 or touchpad, etc.

The vehicle attention system 100 may be a system which enables one occupant of a vehicle to communicate with another occupant of the vehicle. For example, a driver of the vehicle may interact with an interface, such as the user interface 120, and manually select another occupant and/or associated seat with whom to interact. Based on the selection, the vehicle attention system 100 may provide a stimulus, such as a seat vibration to the selected occupant. In this way the vehicle attention system 100 may enable occupants of the vehicle to communicate with one another.

According to one aspect, the vehicle attention system 100 may be implemented in a manual fashion or in a manual mode. According to this aspect, when a first user or first occupant (e.g., the driver of the vehicle) desires to communicate with a second user or second occupant, the display 122 of the user interface 120 may render an image of a seating arrangement associated with the vehicle. For example, the first occupant may be seated in the first seat and the second occupant may be seated in the second seat of the vehicle, which may be another seat or any other seat in the vehicle. The image of the seating arrangement may be stored on the memory 114 of the vehicle attention system 100. In any event, the first user may provide a user input to the user interface 120. The user interface 120 may be a piece of hardware, such as the touchscreen 124 with the display 122, which may render a touchscreen keyboard or other input interface, and enable the first occupant to provide the user input to the vehicle attention system 100.

The user interface 120 may be a touchscreen interface rendered on the display 122 of the touchscreen 124. The display 122 may render the image of the seating arrangement of the vehicle. In this regard, the user interface 120 may receive the user input from one of the occupants of the vehicle. The user input may be a selection or a command indicative of one or more of the seats of the vehicle and/or one or more of the occupants with whom the first occupant desires to communicate. The user input may be a touch input associated with a portion of the image of the seating arrangement. For example, the first occupant may provide a user input indicative of a command to communicate with a second occupant seated in the second seat by touching the portion of the image associated with the second seat on the touchscreen 124. This command may be received by the user interface 120 and passed along the CAN bus 170 to the memory 114 of the vehicle attention system 100.

The processor 112 of the controller 110 may control the second actuator of the second seat to activate, thereby vibrating the second seat based on the command provided by the first occupant. Stated another way, the controller 110 may activate the first actuator of the first seat or the second actuator of the second seat based on the user input, which may be indicative of a target occupant or associated target seat, determined based on the user input provided or received by the user interface 120. The user input may be a command commanding the controller 110 to activate the first actuator of the first seat or a command commanding the controller 110 to activate the second actuator of the second seat.

For example, when the user or the first occupant presses a button on the user interface 120 representative of the first seat, the command commanding the controller 110 to activate the first actuator may be transmitted from the user interface 120 to the processor 112 of the controller 110. Similarly, when the user or the first occupant presses a button on the user interface 120 representative of the second seat, the command commanding the controller 110 to activate the second actuator may be transmitted from the user interface 120 to the processor 112 of the controller 110. The controller 110 may thus activate the first actuator or the second actuator based on the user input (e.g., depending on the command provided by the user input or the associated seat). In this way, the vibration provided by the second seat and the second actuator may enable the first occupant to gain the attention of the second occupant.

According to one aspect, the vehicle attention system 100 may be implemented in an occupant recognition mode, such as an occupant recognition mode based on image recognition or facial recognition. According to this aspect, the image capture device 140 may capture an image of an interior of the vehicle, including the seating arrangement of one or more of the seats of the vehicle. Stated another way, the image capture device 140 may be a camera, which may capture the image of the seating arrangement of the vehicle. The image may include the first seat and the second seat and one or more of the occupants seated therein. In this regard, the image analyzer 142 may analyze the image of the seating arrangement to determine which seats are occupied and which seats are not occupied. Further, the image analyzer 142, which may be implemented via the processor 112, may determine the occupied status for each seat of the vehicle (e.g., the first seat, the second seat, the third seat, etc.).

According to one aspect, the seat sensors of the respective seats may be utilized by the processor 112 or the controller 110 to further confirm or determine the occupied status of each seat. For example, the first seat may include the first seat sensor and the second seat may include the second seat sensor. The occupied status of the respective seats may be taken or empty. The first seat sensor and the second seat sensor may determine an occupied status for the first seat and an occupied status for the second seat, respectively. As previously discussed, the occupied status may be taken or empty, and the processor 112 may also determine that a seat with non-human cargo is empty (e.g., via image processing, facial recognition, confirmation via the user interface 120, etc.). Further, the image analyzer 142 and the seat sensors may determine whether or not the seat is taken or empty and distinguish between a human occupant and other types of cargo (e.g., a car seat, groceries, pets, etc.). According to one aspect, the seat sensors may be weight sensors or other types of sensors (e.g., RFID).

The image analyzer 142 may thus determine the occupied status for one or more of the seats of the vehicle. Additionally, the image analyzer 142 may, from the pool of seats occupied by human occupants, identify one or more of the respective occupants. For example, the image analyzer 142 may implement or utilize facial recognition to identify each occupant of the vehicle. According to this aspect, the image capture device 140 may capture one or more images of individuals or occupants during a training phase and use these images to identify occupants seated in the vehicle and seats associated with each occupant.

According to another aspect, other images, such as images linked to a social media account, provided via the mobile device 180, may be utilized to train the vehicle attention system 100 facial recognition feature of the image analyzer 142. In this way, the image analyzer 142 may identify, by name, a first occupant associated with the first seat based on the first seat being taken or a second occupant associated with the second seat based on the second seat being taken, for example.

Further, the image analyzer 142, during the training phase, may capture the images of occupants of the vehicle, and the user or the driver may be asked to enter names of the occupants via the user interface 120. According to other aspects, identification of occupants may be done automatically via linking a social media account from the mobile device 180 of the user or respective occupant to the vehicle attention system 100. Regardless, the image analyzer 142 may determine the target occupant and associated target seat based on facial recognition of the occupants of the vehicle (e.g., the first occupant, the second occupant, a third occupant, etc.) and the layout of the vehicle, which may be determined based on the image or based on a model of the vehicle.

According to another aspect, the image analyzer 142 may transmit, via the communication interface 172, the image of the seating arrangement (e.g., which may include images of the occupants of the vehicle) to a server 194 (e.g., which may be communicatively coupled to the vehicle attention system 100) which may determine the occupancy status of each seat, perform the facial recognition of the occupants of the vehicle, and/or identify the occupants of the vehicle and associated or corresponding seats. In this way, the image analyzer 142 may determine or provide a seating chart of all occupants of the vehicle. The image analyzer 142 may identify the first occupant or the second occupant based on an image database or facial recognition, accessed via the communication interface 172 or via the mobile device 180, for example.

One of the occupants of the vehicle, such as the driver of the vehicle, may utilize the user interface 120 to communicate with another one of the occupants of the vehicle. For example, the user interface 120 may be rendered on the display 122 of the touchscreen 124, and receive the user input indicative of the communication selection or a seat selection. As another example, the user interface 120 may include the microphone 130. According to this example, the microphone 130 may capture an audio sample as the user input from the user interface 120, which includes speech of one or more of the occupants. In this regard the voice analyzer 132 may perform voice to text or an audio to text conversion on the audio sample and parse the text for a command indicative of the seat selection. Stated another way, the voice analyzer 132 may be implemented via the processor 112 and may determine a command to activate the first actuator or a command to activate the second actuator (or any other actuators of the vehicle attention system 100) for the controller 110 based on the sound sample.

For example, the audio sample "you guys in the backseat" may be parsed and "backseat" determined to be a target seat selection. As another example, "Michael, please be quiet", the voice analyzer 132 may determine that "Michael" is the desired target. Here, Michael may be the user input, which may include or be the name of one of the occupants (e.g., the user input may include the name of the first occupant or a name of the second occupant). Stated another way, the voice analyzer 132 or the user interface 120 may determine the target occupant and associated target seat from among the seats of the vehicle (e.g., the first seat, the second seat, the third seat, etc.) based on the user input, such as the sound sample. Explained yet again, the voice analyzer 132 may determine the target occupant and associated seat based on a specific word identifier, such as a name, a characteristic of an occupant, a seat location or a seat number, extracted from the text.

Based on the determined seat selection or determined target seat(s), the processor 112 may determine or generate a command to activate one or more actuators for one or more corresponding seats. In other words, for the example described above, for "Michael, please be quiet", the image analyzer 142 may determine, based on the image of the seating arrangement of the vehicle and based on facial recognition, a layout or the seating arrangement of the vehicle, and thus the seat in which Michael is seated or located. When the voice command is received via the microphone 130 or via the user interface 120, the target occupant may be determined to be Michael by the voice analyzer 132. Based on this target determination, the controller 110 may control the actuator of the seat in which Michael is sitting to activate, thereby vibrating Michael's seat, and enabling the first occupant to get Michael's attention.

The vehicle attention system 100 may enable different levels of vibration to be provided based on a command (e.g., "vibrate Michael's seat at 50%") or based on a response from the second occupant (e.g., Michael in this example). In other words, if Michael is sleeping, and non-responsive to a first communication attempt via the seat vibration, a second communication attempt may be provided by the controller 110 at an increased intensity, for example. According to this aspect, the responsiveness of the second occupant may be monitored via the microphone 130 or via the image capture device 140. The vehicle attention system 100 may also automatically increase the intensity of the actuator based on repeated communication attempts (e.g., "Michael, please be quiet", followed by "Michael, don't make me tell you again"). In this example, because a first verbal command or audio sample associated with the second occupant is followed by a second verbal command also associated with the second occupant, the controller 110 may automatically determine or infer this additional or increased intensity.

According to one aspect, the vehicle attention system 100 may be implemented in an occupant recognition mode, such as an occupant recognition mode based on the seat sensor. In this aspect, the vehicle attention system 100 may utilize the seat sensors of the vehicle to determine the seating arrangement or the seating chart of one or more of the occupants of the vehicle. It will be appreciated that a combination of different sensors may be utilized to determine the presence or the seat associated with each occupant of the vehicle. For example, the seat sensors maybe weight sensors which determine whether or not the associated seat is occupied/ taken or empty. According to another aspect, the seat sensors may be sensors which detect the presence of mobile devices 180 of the respective occupants. In any event, the image analyzer 142, the seat sensors, and/or the user interface 120 may be utilized to determine the presence of occupants within the vehicle and to identify the occupants and corresponding seats taken.

When a command indicative of a target seat or indicative of a target occupant is received via the user interface 120, the controller 110 may control the actuator of the target seat to be activated (e.g., at least for a time period). The processor 112 may, when the target occupant is identified by the user interface 120, determine the target seat to be vibrated by cross referencing the seating chart or the seating arrangement determined by the image analyzer 142 or other component of the vehicle attention system 100.

According to one aspect, the controller 110 or the processor 112 may disable an associated infotainment system 162 or portion of the infotainment system 162 based on the user input. In other words, while the actuator of an associated seat is vibrating or active, the infotainment system screen associated with that seat may also be disabled. According to other aspects, all of the infotainment system portions may be disabled while the seat actuator is active or activated, and resumed when the actuator is disabled or cycled off. In this way, the vehicle driver or occupant may better gain the attention of the target occupant.

Similarly, and according to another aspect, the mobile device 180 of the target occupant may be disabled while the actuator is enabled or activated. Returning to the example where Michael is the target occupant and associated with a target seat, if Michael is carrying an associated mobile device 180, the mobile device 180 may be disabled temporarily while the attention vibration command is activated for his seat actuator. For example, if the first occupant is the driver of the vehicle, Michael is the second occupant seated in the second seat, and the first occupant or the driver commands or gestures for (e.g., verbally via the microphone 130 or manually via the touchscreen 124) Michael's seat to vibrate (e.g., not necessarily a direct command, but the command may be "Michael, please be quiet"), if the vehicle attention system 100 detects that Michael, as the second occupant, is carrying his mobile device 180, the communication interface 172 of the vehicle attention system 100 may transmit a command to the associated mobile device 180 based on the user input of "Michael, please be quiet". The transmitted command, when received by the mobile device 180, may be executed by an application installed on the mobile device 180, which may disable features of the mobile device 180 while the second actuator of the second seat (e.g., Michael's seat) is activated.

Figure 2:
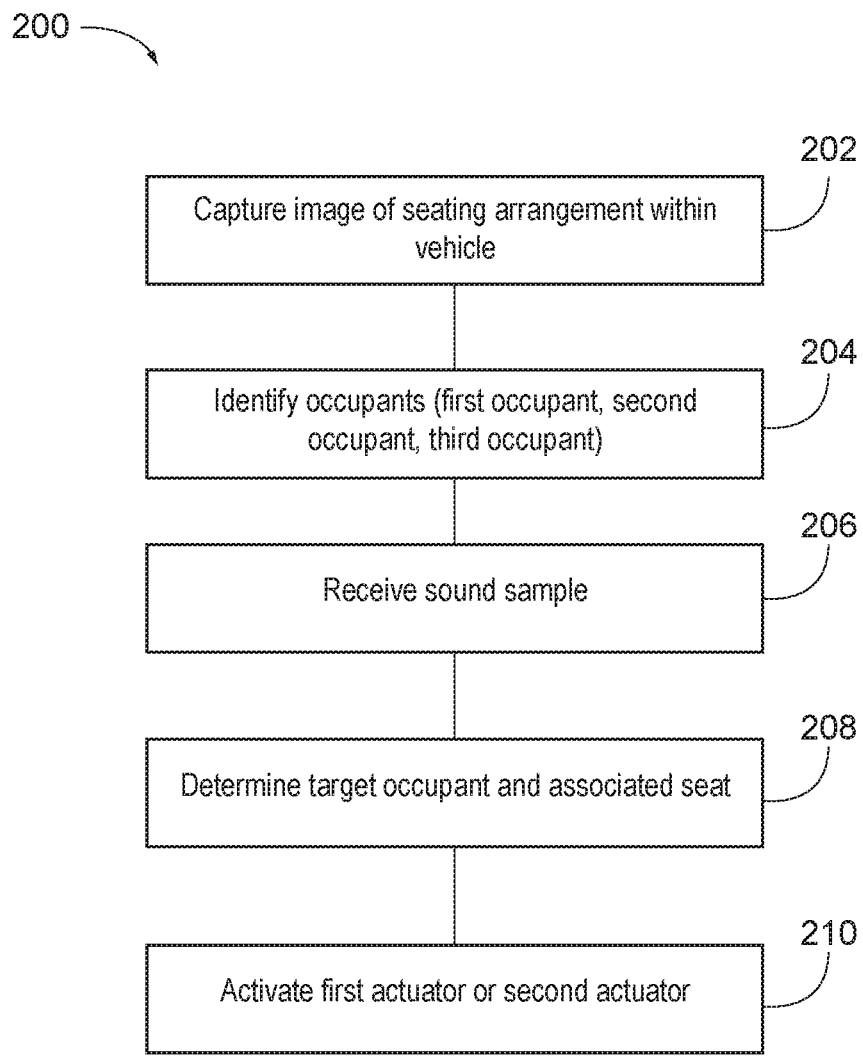
FIG. 2 is an exemplary flow diagram of a vehicle attention method, according to one aspect.

FIG. 2 is an exemplary flow diagram of a vehicle attention method 200, according to one aspect. The vehicle attention method may include capturing 202 an image of a seating arrangement of a vehicle including a first seat and a second seat, identifying 204 a first occupant occupying the first seat of the vehicle and a second occupant occupying the second seat of the vehicle, receiving 206 a sound sample, determining 208 a target occupant and associated seat from among the first seat and the second seat based on the sound sample, and activating 210 a first actuator of the first seat or a second actuator of the second seat based on the determined target occupant and the determined associated seat. In this way, haptic feedback may be provided by the actuators of the vehicle attention system.

Figure 3:
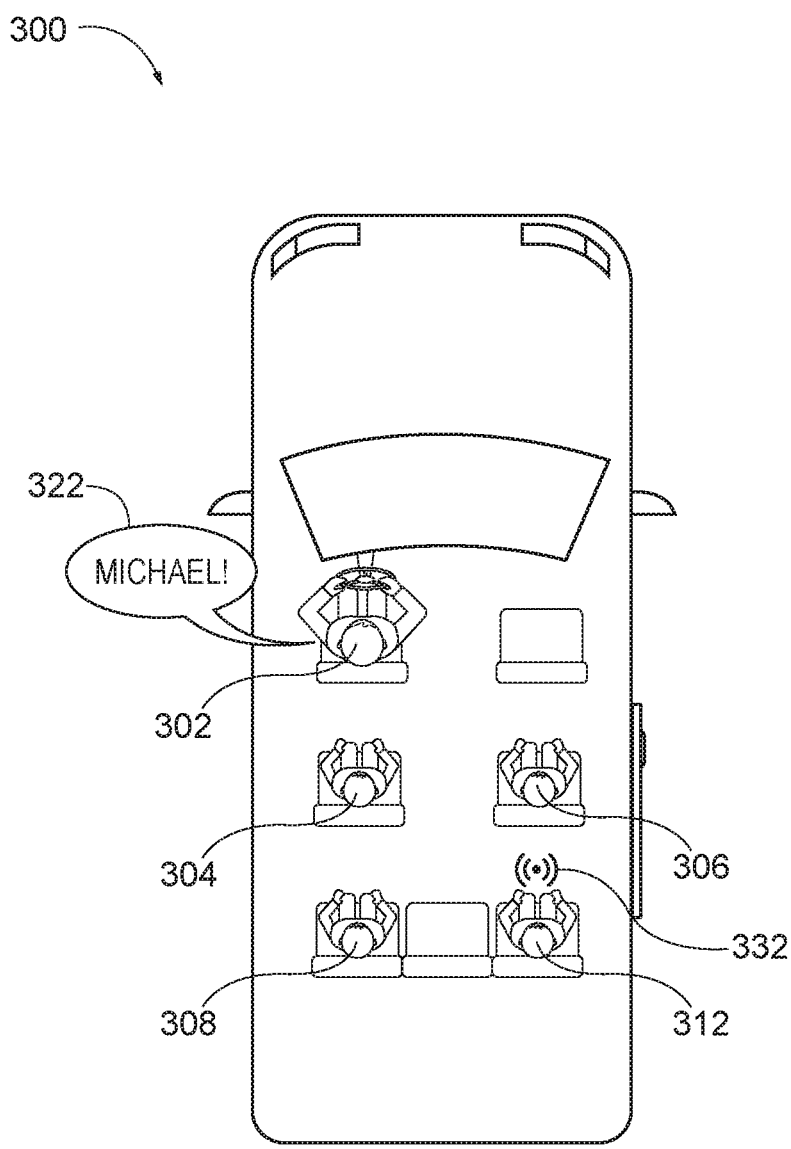
FIG. 3 is an exemplary scenario where the vehicle attention system of FIG. 1 may be implemented, according to one aspect.

FIG. 3 is an exemplary scenario 300 where the vehicle attention system 100 of FIG. 1 may be implemented, according to one aspect. In FIG. 3, there is a vehicle equipped with the vehicle attention system 100 of FIG. 1. A driver 302 is sitting in a first seat. A second seat and seat six are empty. Occupants 304, 306, 308, and 312, are sitting in the backseat(s) of the vehicle in seat three, seat four, seat five, and seat seven, for example. The image capture device 140 may capture an image of all of the occupants 302, 304, 306, 308, and 312 of the vehicle. The image analyzer 142 may determine the identities of respective occupants of the vehicle and a seating arrangement of the occupants 302, 304, 306, 308, and 312. In this example, Michael or the fifth occupant 312 of the vehicle, is seated in seat seven. When the driver 302 issues a voice command 322, received as the sound sample by the microphone 130 and parsed by the voice analyzer 132. The processor may determine that Michael is the target occupant and/or the associated target seat, and the controller may control the actuator of the seventh seat to vibrate or activate 332. In this way, the vehicle attention system 100 may enable occupants of the vehicle to communicate with one another via haptic feedback.

Figure 4:
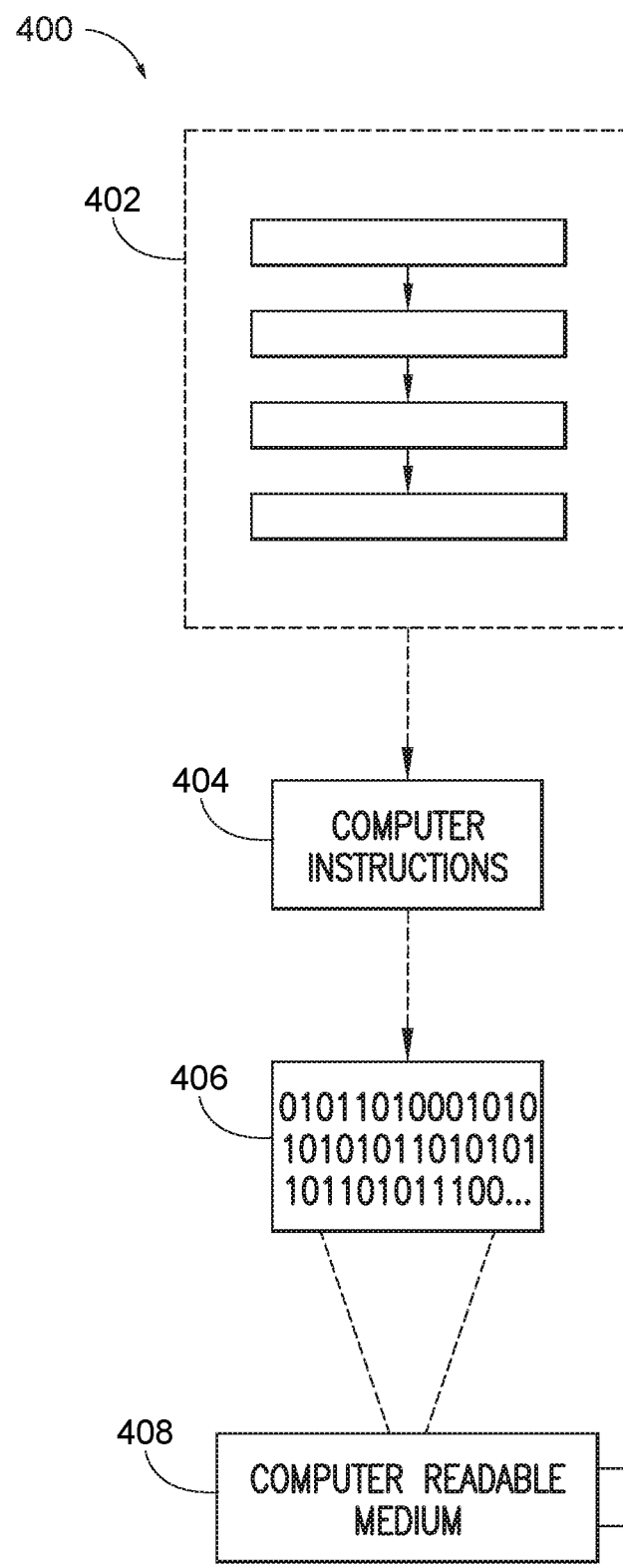
FIG. 4 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 4, wherein an implementation 400 includes a computer-readable medium 408, such as a CD-R, DVD-R, flash drive, a platter of a hard disk drive, etc., on which is encoded computer-readable data 406. This encoded computer-readable data 406, such as binary data including a plurality of zero's and one's as shown in 406, in turn includes a set of processor-executable computer instructions 404 configured to operate according to one or more of the principles set forth herein. In this implementation 400, the processor-executable computer instructions 404 may be configured to perform a method 402, such as the vehicle attention method 200 of FIG. 2. In another aspect, the processor-executable computer instructions 404 may be configured to implement a system, such as the vehicle attention system 100 and/or mobile device 180 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 5:
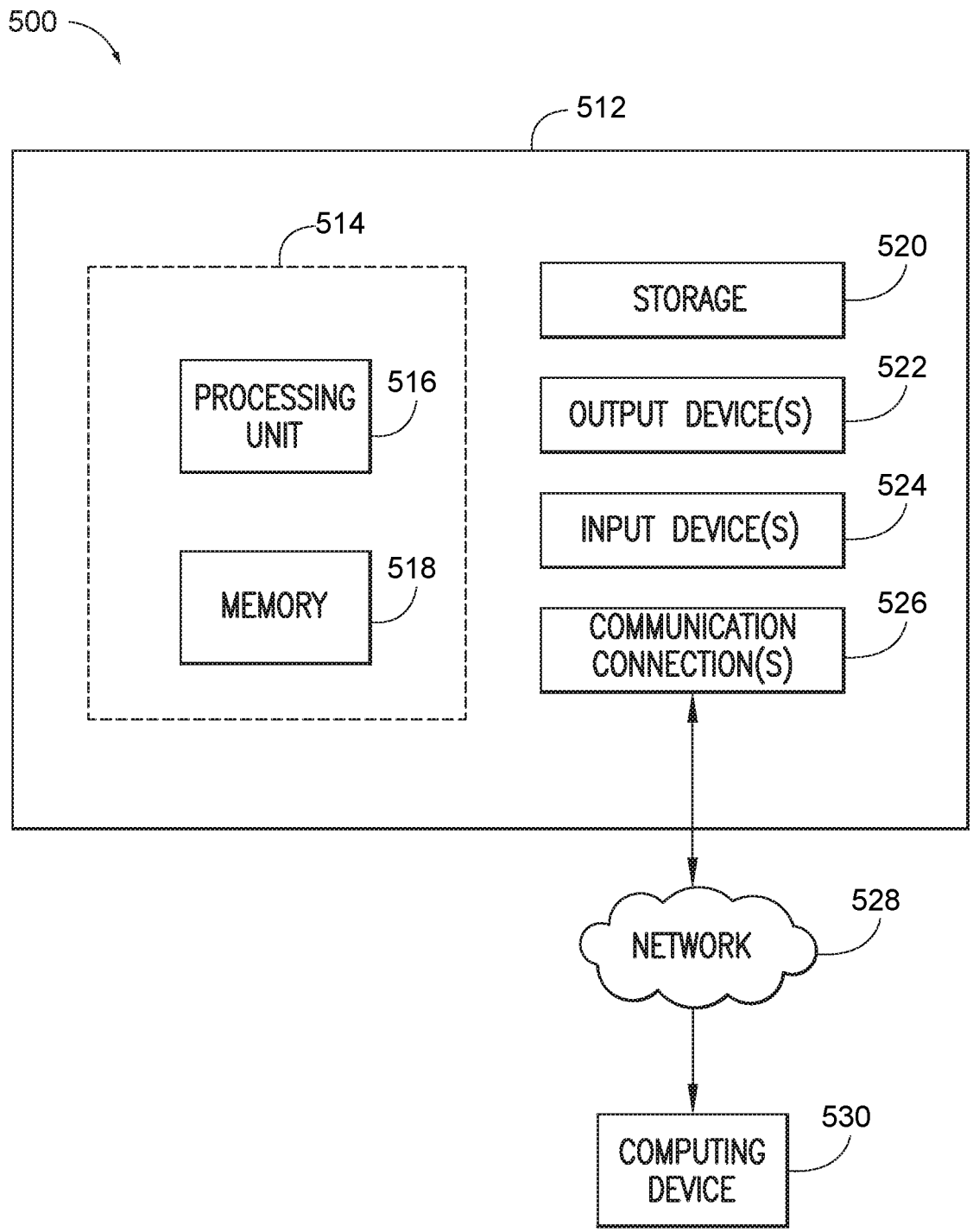
FIG. 5 is an illustration of an example computing environment where one or more of the provisions set forth herein are implemented, according to one aspect.

FIG. 5 and the following discussion provide a description of a suitable computing environment to implement aspects of one or more of the provisions set forth herein. The operating environment of FIG. 5 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 5 illustrates a system 500 including a computing device 512 configured to implement one aspect provided herein. In one configuration, the computing device 512 includes at least one processing unit 516 and memory 518. Depending on the exact configuration and type of computing device, memory 518 may be volatile, such as RAM, non-volatile, such as ROM, flash memory, etc., or a combination of the two. This configuration is illustrated in FIG. 5 by dashed line 514.

In other aspects, the computing device 512 includes additional features or functionality. For example, the computing device 512 may include additional storage such as removable storage or non-removable storage, including, but not limited to, magnetic storage, optical storage, etc. Such additional storage is illustrated in FIG. 5 by storage 520. In one aspect, computer readable instructions to implement one aspect provided herein are in storage 520. Storage 520 may store other computer readable instructions to implement an operating system, an application program, etc. Computer readable instructions may be loaded in memory 518 for execution by processing unit 516, for example.

The term "computer readable media" as used herein includes computer storage media. Computer storage media includes volatile and nonvolatile, removable and non-removable media implemented in any method or technology for storage of information such as computer readable instructions or other data. Memory 518 and storage 520 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the computing device 512. Any such computer storage media is part of the computing device 512.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The computing device 512 includes input device(s) 524 such as keyboard, mouse, pen, voice input device, touch input device, infrared cameras, video input devices, or any other input device. Output device(s) 522 such as one or more displays, speakers, printers, or any other output device may be included with the computing device 512. Input device(s) 524 and output device(s) 522 may be connected to the computing device 512 via a wired connection, wireless connection, or any combination thereof. In one aspect, an input device or an output device from another computing device may be used as input device(s) 524 or output device(s) 522 for the computing device 512. The computing device 512 may include communication connection(s) 526 to facilitate communications with one or more other devices 530, such as through network 528, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects.

Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle attention system, comprising:
 a first seat including a first actuator;
 a second seat including a second actuator;
 a user interface receiving a user input from an occupant of a vehicle, wherein the user input includes a spoken name of a first occupant or a spoken name of a second occupant;
 a voice analyzer, implemented via a processor, determining a target occupant and associated seat from among the first seat and the second seat based on the name of the first occupant or the name of the second occupant from a sound sample of the spoken name of the first occupant or the spoken name of the second occupant; and
 a controller activating the first actuator or the second actuator to vibrate the first seat or the second seat, for the target occupant, based on the spoken name of the first occupant or the spoken name of the second occupant from the user input,
 wherein the user input is received from a third occupant who is not the first occupant or the second occupant, and
 wherein the third occupant does not occupy the first seat or the second seat.

2. The vehicle attention system of claim 1, wherein the user input is a command to activate the first actuator or a command to activate the second actuator.

3. The vehicle attention system of claim 1, comprising an image capture sensor capturing an image of a seating arrangement of the vehicle including the first seat and the second seat.

4. The vehicle attention system of claim 3, comprising an image analyzer, implemented via a processor:
 wherein the image analyzer determines an occupied status for the first seat and an occupied status for the second seat, wherein the occupied status for respective seats is taken or empty; and
 wherein the image analyzer identifies the name of the first occupant associated with the first seat based on the first seat being taken or the name of the second occupant associated with the second seat based on the second seat being taken.

5. The vehicle attention system of claim 4, wherein the image analyzer identifies the first occupant or the second occupant based on an image database or facial recognition.

6. The vehicle attention system of claim 1, comprising a microphone receiving the sound sample as the user input.

7. The vehicle attention system of claim 6, wherein the voice analyzer determines a command to activate the first actuator or a command to activate the second actuator for the controller based on the sound sample.

8. The vehicle attention system of claim 1, wherein the first seat includes a first seat sensor and the second seat includes a second seat sensor.

9. The vehicle attention system of claim 8, wherein the first seat sensor and the second seat sensor determine an occupied status for the first seat and an occupied status for the second seat, respectively, and wherein the occupied status for respective seats is taken or empty.

10. The vehicle attention system of claim 8, wherein the first seat sensor and the second seat sensor are weight sensors.

11. The vehicle attention system of claim 1, wherein the controller disables an associated infotainment system or portion of the infotainment system based on the user input.

12. The vehicle attention system of claim 1, comprising a communication interface, implemented via a processor, transmitting a command to an associated mobile device based on the user input, wherein the transmitted command, when executed by the mobile device, disables a feature of the mobile device while the first actuator or the second actuator is activated.

13. The vehicle attention system of claim 1, wherein the user interface is a touchscreen interface rendering an image of a seating arrangement of the vehicle and the user input is a touch input associated with a portion of the image of the seating arrangement.

14. A seat attention system, comprising:
a first seat including a first actuator;
a second seat including a second actuator;
an image capture sensor capturing an image of a seating arrangement within an area including the first seat and the second seat;
an image analyzer, implemented via a processor, identifying a first occupant occupying the first seat and a second occupant occupying the second seat;
a microphone receiving a sound sample including a name of the first occupant or a name of the second occupant;
a voice analyzer, implemented via the processor, determining a target occupant and associated seat from among the first seat and the second seat based on the name of the first occupant or the name of the second occupant from the sound sample; and
a controller activating the first actuator or the second actuator to vibrate, based on the determined target occupant, the determined associated seat, and the name of the first occupant or the name of the second occupant from the sound sample,
wherein the sound sample is received from a third occupant who is not the first occupant or the second occupant, and
wherein the third occupant does not occupy the first seat or the second seat.

15. The seat attention system of claim 14, wherein the voice analyzer converts the sound sample from audio to text.

16. The seat attention system of claim 15, wherein the voice analyzer determines the target occupant and associated seat based on a word identifier extracted from the text.

17. The seat attention system of claim 14, wherein the image analyzer determines the target occupant and associated seat based on facial recognition of the first occupant or the second occupant.

18. The seat attention system of claim 14, comprising a communication interface, implemented via the processor, transmitting a command to an associated mobile device based on the sound sample and the determined target occupant, wherein the transmitted command, when executed by the mobile device, disables a feature of the mobile device while the first actuator or the second actuator is activated.

19. A vehicle attention method, comprising:
capturing an image of a seating arrangement of a vehicle including a first seat and a second seat;
identifying a first occupant occupying the first seat of the vehicle and a second occupant occupying the second seat of the vehicle;
receiving a sound sample including a name of the first occupant or a name of the second occupant;
determining a target occupant and associated seat from among the first seat and the second seat based on the name of the first occupant or the name of the second occupant from the sound sample; and
activating a first actuator of the first seat or a second actuator of the second seat to vibrate based on the determined target occupant, the determined associated seat, and the name of the first occupant or the name of the second occupant from the sound sample,
wherein the sound sample is received from a third occupant who is not the first occupant or the second occupant, and
wherein the third occupant does not occupy the first seat or the second seat.

\* \* \* \* \*